(No Model.)

J. A. BECK.
MEANS FOR UTILIZING WASTE HEAT FROM COKE OVENS.

No. 464,844. Patented Dec. 8, 1891.

Witnesses:

Inventor.
John A. Beck
O D Lewis
Att'y.

THE NORRIS PETERS CO., PHOTO-LITHO., WASHINGTON, D. C.

UNITED STATES PATENT OFFICE.

JOHN A. BECK, OF PITTSBURG, PENNSYLVANIA.

MEANS FOR UTILIZING WASTE HEAT FROM COKE-OVENS.

SPECIFICATION forming part of Letters Patent No. 464,844, dated December 8, 1891.

Application filed February 6, 1891. Serial No. 380,531. (No model.)

*To all whom it may concern:*

Be it known that I, JOHN A. BECK, a citizen of the United States, residing at Pittsburg, in the county of Allegheny and State of Pennsylvania, have invented certain new and useful Improvements in Means for Utilizing the Waste Heat from Coke-Ovens; and I do hereby declare the following to be a full, clear, and exact description of the invention, such as will enable others skilled in the art to which it pertains to make and use the same, reference being had to the accompanying drawings, which form a part of this specification.

My invention relates to certain improvements in means for utilizing the waste heat from coke-ovens; and it consists in certain peculiarities in the construction, arrangement, and combination of the several parts, substantially as hereinafter described and particularly set forth in the subjoined claims.

Figure 1:
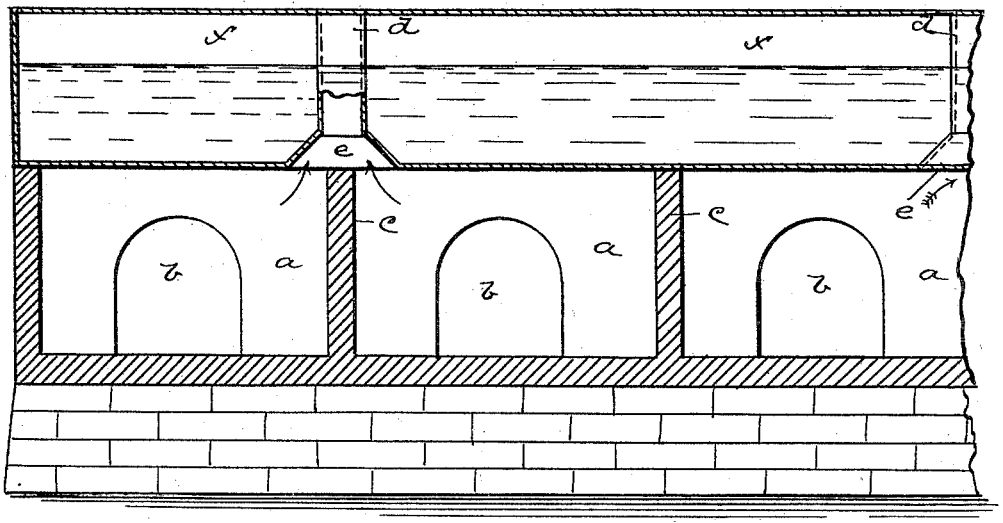
Figure 2:
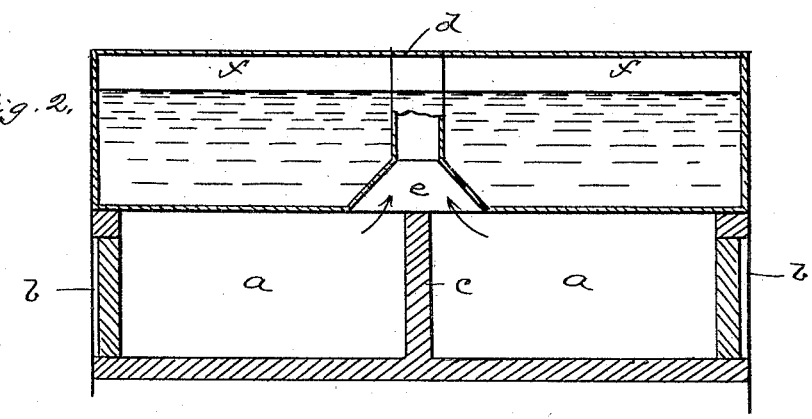
Figure 3:
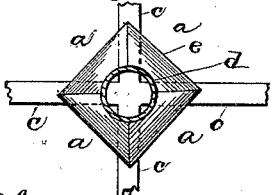

In the accompanying drawings, Figure 1 is a side sectional elevation of a series of coke-ovens having an evaporating pan or vat arranged on the top of the same. Fig. 2 is a sectional end elevation of the same. Fig. 3 is a plan view of a part of the device, showing the relative arrangement of draft stacks or vents and ovens.

To utilize the waste heat of coke-ovens $a$, I construct the same in two parallel rows and facing in opposite directions, after the manner now in common use, and provide the same with charging-doors $b$. These ovens are separated the one from the other by partition-walls $c$ and are left open at the top. Covering these open-topped ovens is a large fluid-containing vessel, such as a boiler or evaporating-pan $f$, through which suitable vents or draft-stacks $d$ are brought to allow the waste products of combustion to escape from the ovens $a$. These draft-stacks $d$ are arranged at the inner angles $g$ of the ovens and having a bell-mouth flare $e$, which will conduct the waste products of combustion from four of the ovens, but may be arranged in various other ways.

If it is desired to reduce salt-water to greater specific gravity, the same is placed in a vat or pan and the quantity of water reduced, the balance being then drawn off to be treated in the ordinary manner.

Having thus described my invention, I claim—

1. The combination, with a series of open-topped ovens, of a fluid-containing vessel above the same and draft stacks or vents extending from said ovens through said vessel, each of said stacks or vents having a flaring lower end arranged at the inner end of a plurality of adjacent ovens and communicating with and carrying the waste heat from said plurality thereof, substantially as described.

2. The combination, with a series of open-topped ovens arranged in double parallel rows, of a fluid-containing vessel located above the same and draft stacks or vents extending from said ovens through said vessel, each of said stacks or vents having a flaring lower end arranged at and covering the inner angles of said ovens, as shown, and thereby communicating with and conveying the waste heat from four adjacent ovens.

In testimony that I claim the foregoing I hereunto affix my signature this 15th day of November, A. D. 1890.

JOHN A. BECK. [L. S.]

In presence of—
 CHARLES LARGE,
 M. E. HARRISON.